(No Model.) 3 Sheets—Sheet 1.

J. R. WILHELM.
BEE HIVE.

No. 457,550. Patented Aug. 11, 1891.

Witnesses
Harry L. Amer.
H. F. Riley

Inventor
John R. Wilhelm,
By his Attorneys,
C. A. Snow & Co.

(No Model.) 3 Sheets—Sheet 2.
J. R. WILHELM.
BEE HIVE.
No. 457,550. Patented Aug. 11, 1891.
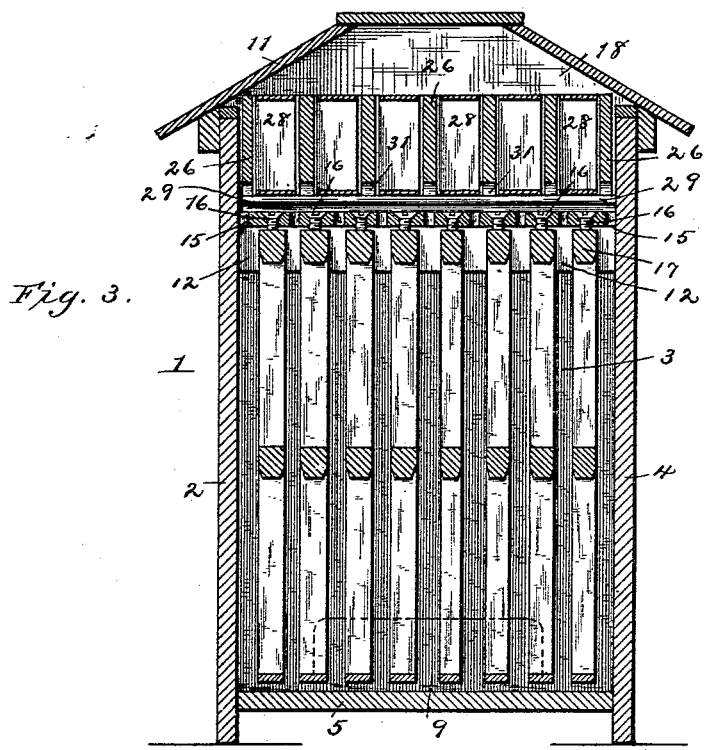
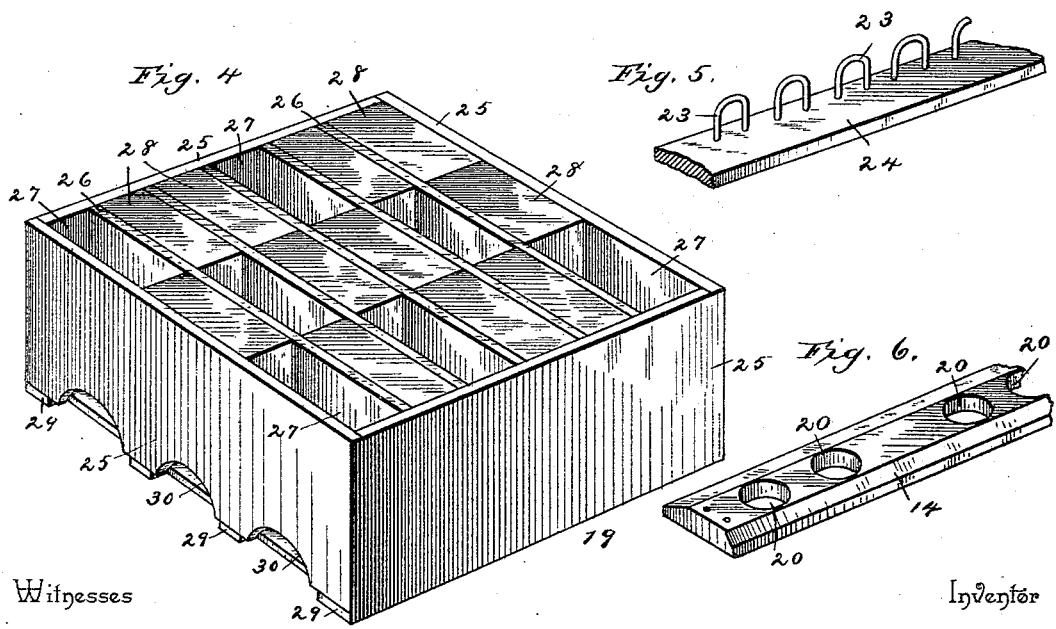
Witnesses
Harry L. Amer.
H. J. Riley
By his Attorneys,
C. A. Snow & Co.
Inventor
John R. Wilhelm.

(No Model.) 3 Sheets—Sheet 3.
J. R. WILHELM.
BEE HIVE.
No. 457,550. Patented Aug. 11, 1891.
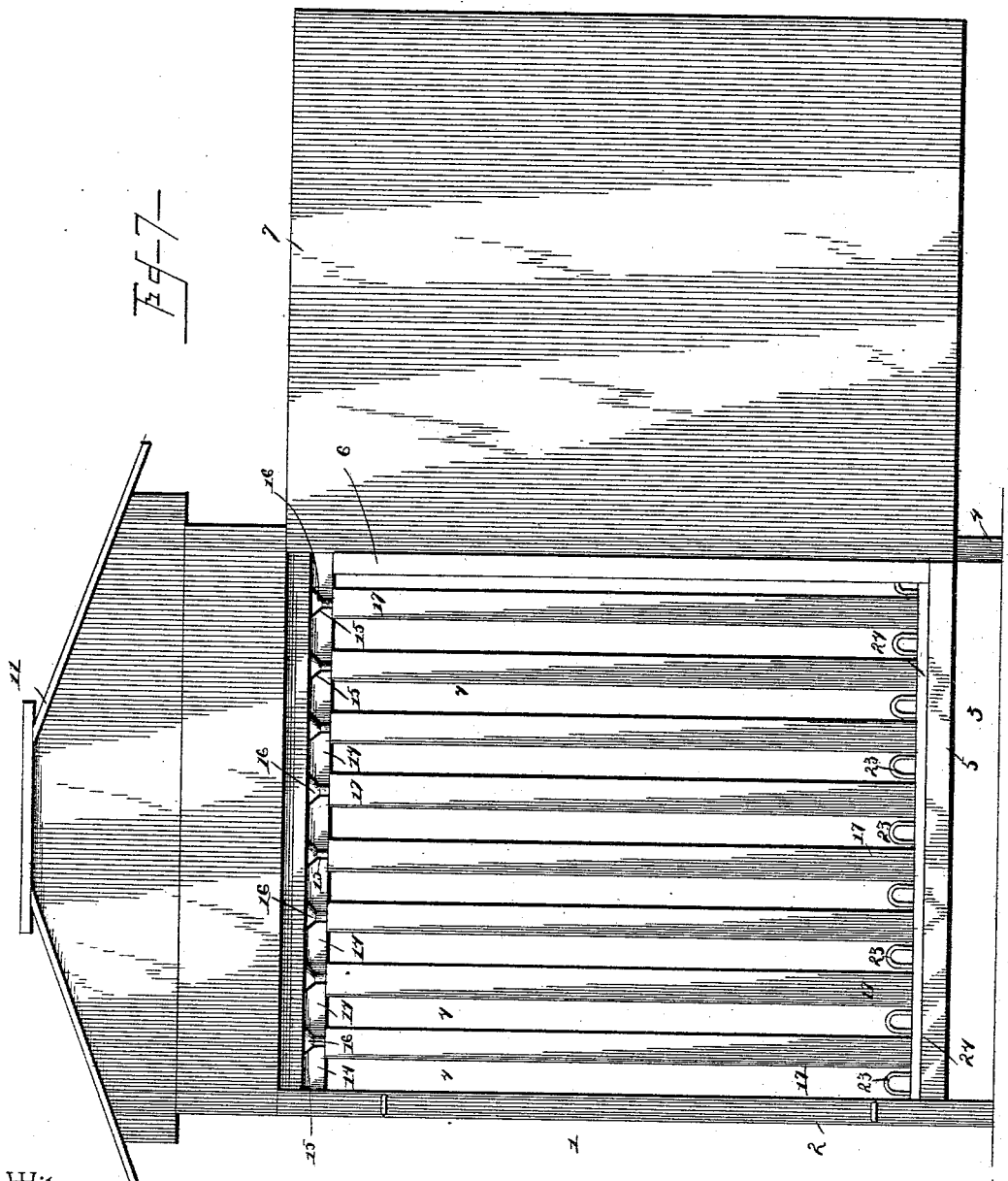
Witnesses
Geo. E. Fruch.
H. F. Riley
Inventor
John R. Wilhelm
By his Attorneys,
C. A. Snow & Co.

UNITED STATES PATENT OFFICE.

JOHN R. WILHELM, OF ADDISON, NEW YORK.

BEE-HIVE.

SPECIFICATION forming part of Letters Patent No. 457,550, dated August 11, 1891.

Application filed March 6, 1890. Serial No. 342,834. (No model.)

*To all whom it may concern:*

Be it known that I, JOHN R. WILHELM, a citizen of the United States, residing at Addison, in the county of Steuben and State of New York, have invented a new and useful Improvement in Bee-Hives, of which the following is a specification.

The invention relates to improvements in bee-hives.

The object of the present invention is to provide a simple and inexpensive bee-hive, adapted to be readily and thoroughly examined and capable of having its honey-sections readily removed and replaced without liability of injuring the honey or disturbing the other sections or the bees.

A further object of the invention is to provide a bee-hive from which the honey-sections for holding the honey for commercial use may be simultaneously removed and replaced by another set of sections.

The invention consists in the construction and novel combination and arrangement of parts, hereinafter fully described, illustrated in the accompanying drawings, and pointed out in the claims hereto appended.

Figure 1:
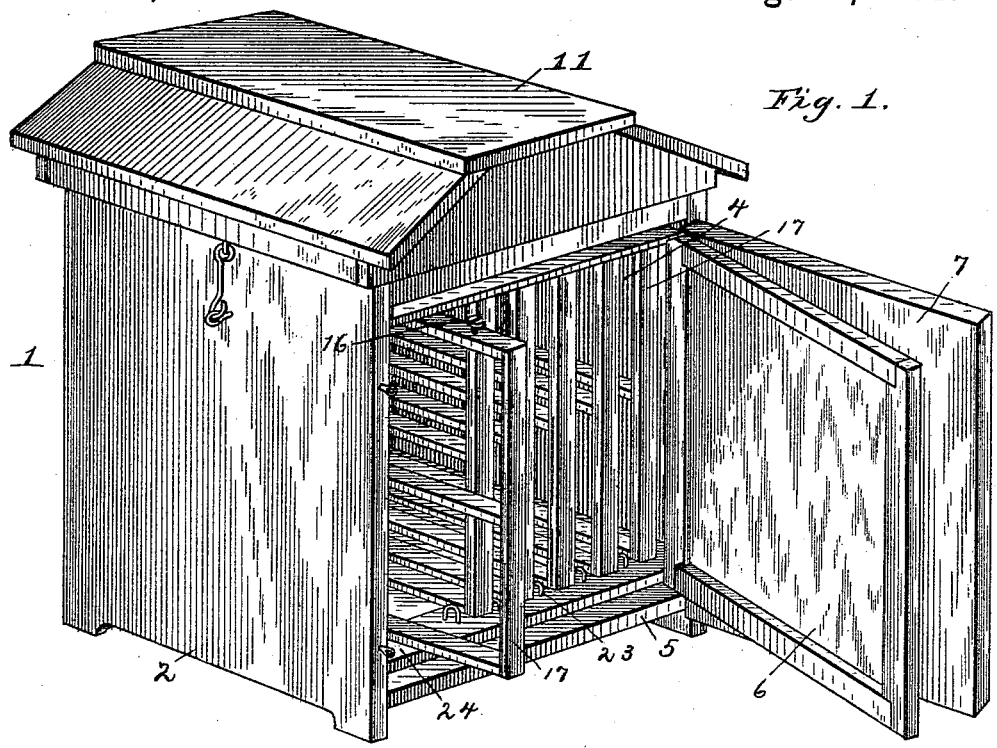
Figure 2:
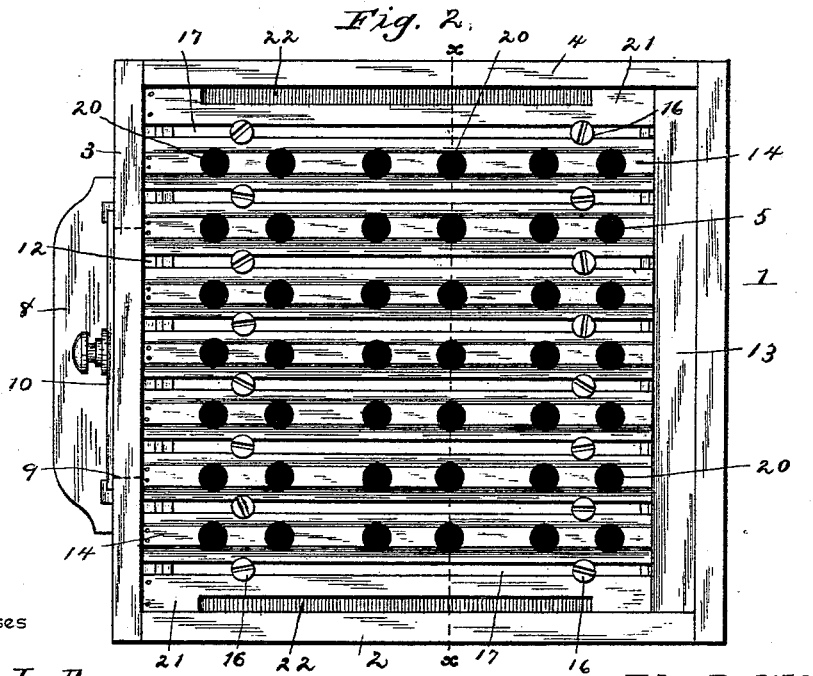

In the drawings, Figure 1 is a rear perspective view of a bee-hive constructed in accordance with the invention, the wooden and glass door being open and one of the brood-frames being slightly withdrawn. Fig. 2 is a plan view, the cover and removable crate for holding the honey-sections being removed. Fig. 3 is a vertical sectional view on the line *x x* of Fig. 2. Fig. 4 is a detail perspective view of the removable crate partially filled with honey-sections. Fig. 5 is a detail view of the cross-strip which spaces the lower ends of the brood-frames and prevents the latter from striking together and injuring the honey while being inserted in and withdrawn from the hive. Fig. 6 is a detail view of one of the strips, showing the openings. Fig. 7 is a rear elevation of the hive, the doors being open, as shown in Fig. 1.

Referring to the accompanying drawings, 1 designates the body, which is constructed of a suitable material, and consists of the sides 2, 3, and 4 and the bottom 5, which is arranged slightly above the lower edges of the sides. The rear of the body is provided with a glass door 6, that shuts within it, and a wooden door 7, that lies flush when closed with the rear edges of the sides 2 and 4, and is secured in its closed position by hooks and eyes. The front side of the hive-body is provided with an aligning-board 8 and an opening 9, that is closed by a sliding door 10. The body is covered by a removable cover 11, that fits over the sides and is secured in place by hooks and eyes. The front of the body is provided on its inner face near the upper edge with a cleat 12, and the body is further provided on its inner opposite side with a cross-bar 13, whose lower edge is arranged slightly above the upper edge of the cleat 12, and the body is further provided with a series of strips 14, that are secured to the upper face of the cleat 12 and to the lower face of the bar 13, and they are arranged horizontally in the same plane and at intervals to provide spaces 15 between them to receive heavy studs 16, that may consist of the heads of large screws and that project from the upper bars of the brood-frames 17, that are adapted to be inserted separately through the open side, and the heavy studs are slipped in the space between the strips and engage the upper edges of the strips and thereby suspend the brood-frames 17 therefrom.

Each brood-frame is preferably provided with two studs that are arranged a short distance from the ends of the brood-frame, and the latter fits closely against the bottoms of the strips and closes the spaces between them and thus prevents bees ascending to the upper chamber 18 through the spaces 15; but in order to provide passages whereby the bees may ascend to the upper chamber, in which is placed a tray or crate 19 to hold the honey-sections for receiving the honey for commercial purposes after the bees have filled the lower brood-frames, the strips 14 are provided, each of which has a series of openings 20. The strips 21, which lie adjacent to the sides 2 and 4 of the hive-body, are provided with longitudinal recesses 22 to permit the bees to find ready access to the upper chamber at the sides, which is advantageous. The lower ends of the frames are separated by a series of staples 23, that are arranged in a strip 24, that extends across the bottom of the hive on the inside within a short distance from its rear side and also provides a stop for the glass door 6. The cross-strip is preferably provided with the series of staples that are interposed between the bottom of the brood-frames. It will readily be seen that the frames can be removed from the hive-body and inserted therein separately and without liability of injuring the honey therein, which is exceedingly advantageous. It is also often desirable to remove the frames and change them from one hive to another in cases where the swarms of bees have unequal amounts of honey, and there is a great scarcity in some hives and consequent liability of the bees dying. By this construction the honey can be equally distributed without disturbing the bees, and enables the latter to be given more care.

In the chamber 18, between the upper edges of the body and the strips 14, is placed a crate 19, which is arranged horizontally in the hive-body and conforms to the configuration of the latter and consists of the four sides 25 and a series of parallel partitions 26, that divide the space inclosed by the sides into compartments 27, that are designed to receive a series of honey-sections 28, that are adapted for the reception of the honey that is gathered for commercial purposes. The bottom of the crate is provided with strips 29, that are arranged at right angles to the partitions and support the edges or adjacent ends of the honey-sections 28 and also provide a bottom for the crate. The sides of the crate which lie adjacent to the strips 21 are provided with series of curved recesses 30, that permit access of the bees from the brood-chamber to the crate, and the parallel partitions 29 are provided with similar recesses 31 to enable the bees to pass to different sections. By this construction an entire set of honey-sections can be readily removed and a new set can be placed in the chamber 18 without necessitating the usual inconvenience and delay of removing the honey-sections separately.

The brood-frames are arranged edgewise to the glass door in convenient position to permit ready and thorough examination thereof, and by the entrance and exit opening for the bees opposite the glass door sufficient light can be obtained to illuminate the interior of the hive for inspection purposes. The bottom bars of the brood-frames are arranged a short distance above the cross-strip that is provided with separating staples for spacing the brood-frames, and there is no contacting surface and there is little liability of the bees building beyond the frames and causing the same to stick, and the frames even in case of slight sticking can be readily separated by a slight lateral movement of the lower ends of the frames, which the arrangement of the parts permit, as the staples do not fit jam against the frames.

My invention has special advantages over the common style of bee-hives in which the honey-sections are dropped separately into the top of the hive. In my hive all of the honey-sections containing honey for commercial use are combined in a crate, so that they can be all removed at the same time and their place supplied by another crate having empty sections. The sliding brood-frames are intended for the support of the bees in winter, and they are ordinarily not intended to be emptied, except when they are found to be tainted with worms. These brood-frames can be drawn out singly for inspection purposes without disturbing the bees very much. The location of the glass door enables the bee culturist to keep a sharp lookout for the presence of worms and to note the general condition of the bees.

In practice the bees first fill up the brood-frames and then ascend to the crate having the honey-sections. Experience has taught me that this plan of not disturbing the brood-frames and allowing them to remain full has great merit over the common plan of entirely stripping the hive of its contents.

Having thus described my invention, what I claim is—

1. In a bee-hive, the combination of the body provided a short distance from its top with a series of strips having openings and arranged at intervals, whereby spaces are formed between them, and the brood-frames suspended from the strips and closing the spaces and provided with headed studs arranged in the spaces and engaging the strips, substantially as described.

2. In a bee-hive, the combination of the body provided a short distance from its top with strips 14, having openings 20 and arranged at intervals, whereby spaces are formed between them, the strip 21, arranged adjacent to the sides of the body and provided with longitudinal recesses 22, and the brood-frames provided with headed studs and suspended from the strips and closing the spaces between the latter, substantially as described.

3. The combination of the body provided a short distance from its top with strips 14, arranged at intervals and having openings 20, the brood-frames provided with headed studs engaging the strips, and the cross-pieces arranged at the bottom of the body and provided with staples interposed between the brood-frames and spacing the same, substantially as described.

4. In a bee-hive, the combination of the body provided with strips 14, arranged at intervals and having openings 20, the strips 21, arranged adjacent to the sides of the body and provided with longitudinal recesses extending along the said sides, the brood-frames having headed studs and suspended from the strips and closing the spaces between the strips, and the crate having the recessed sides and recessed partitions and carrying the honey-sections and arranged on the strips, substantially as described.

5. In a bee-hive, the combination of the body provided with strips arranged at intervals and having openings, the strips 21, arranged at the sides and provided with longitudinal recesses extending along the sides, the brood-frames having headed studs and suspended from the strips and closing the spaces, and the crate carrying the honey-sections and having parallel partitions 26 and the bottom strips 29, arranged at right angles to the partitions, said crate being provided with recesses 30 and 31, substantially as described.

In testimony that I claim the foregoing as my own I have hereto affixed my signature in presence of two witnesses.

JOHN R. WILHELM.

Witnesses:
J. H. SIGGERS,
R. J. MARSHALL.